(12) United States Patent
Zhang et al.

(10) Patent No.: US 11,405,307 B2
(45) Date of Patent: Aug. 2, 2022

(54) INFORMATION TRANSFER METHOD AND DEVICE

(71) Applicant: ZTE CORPORATION, Guangdong (CN)

(72) Inventors: Zheng Zhang, Guangdong (CN); Jinghai Yu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 126 days.

(21) Appl. No.: 16/496,002

(22) PCT Filed: Feb. 9, 2018

(86) PCT No.: PCT/CN2018/075927
§ 371 (c)(1),
(2) Date: Sep. 20, 2019

(87) PCT Pub. No.: WO2018/171359
PCT Pub. Date: Sep. 27, 2018

(65) Prior Publication Data
US 2020/0112503 A1 Apr. 9, 2020

(30) Foreign Application Priority Data
Mar. 22, 2017 (CN) .......................... 201710175493.6

(51) Int. Cl.
*H04W 4/00* (2018.01)
*H04L 45/16* (2022.01)
(Continued)

(52) U.S. Cl.
CPC .......... *H04L 45/16* (2013.01); *H04L 12/1886* (2013.01); *H04L 45/48* (2013.01); *H04L 45/74* (2013.01)

(58) Field of Classification Search
CPC ......... H04L 45/16; H04L 45/48; H04L 45/74; H04L 12/1886; H04L 5/0007;
(Continued)

(56) References Cited

U.S. PATENT DOCUMENTS 8,830,826 B2 * 9/2014 Chen ....................... H04L 45/22
370/228
10,218,524 B2 * 2/2019 Wijnands ................ H04L 45/16
(Continued)

FOREIGN PATENT DOCUMENTS

CN 1859284 A 11/2006
CN 101635634 A 1/2010
(Continued)

OTHER PUBLICATIONS

Chunduri et al., "Using Operator-defined TLVs for Agile Service Deployment", Jan. 5, 2016, IETF, Network Working Group, draft-chunduri-ospf-operator-defined-tlvs-02, pp. 1-8 (Year: 2016).*
(Continued)

*Primary Examiner* — Phuongchau Ba Nguyen
(74) *Attorney, Agent, or Firm* — Li & Cai Intellectual Property (USA) Office (57) ABSTRACT

Disclosed in the present application are an information transfer method and device. When a user side node sends a traffic request through a MLD, IGMP or PIM protocol or sends prefix information through routing protocols such as Babel, BGP, OSPF, ISIS and the like, a forwarding side node can clearly know by a manner of adding a user side mark whether the user side node is connected to the forwarding node. When performing forwarding according to a BIER rule, the forwarding side node can identify the user side node and encapsulate a packet to have a correct destination address to be sent, so as to ensure that the user side node can correctly receive a traffic message.

12 Claims, 6 Drawing Sheets

Send, by a user side node, a multicast protocol message or routing protocol message carrying a user side flag to a forwarding side node — S201

Receive, by a user side node, a message forwarded by a directly connected forwarding side node and having a destination address being an address of the user side node — S202

(51) Int. Cl.
*H04L 12/18* (2006.01)
*H04L 45/48* (2022.01)
*H04L 45/74* (2022.01)

(58) Field of Classification Search
CPC ...... H04L 12/185; H04L 45/54; H04W 28/04; H04W 72/04; H04W 72/042; H04W 88/08
See application file for complete search history.

(56) References Cited

U.S. PATENT DOCUMENTS

| | | | | |
|---|---|---|---|---|
| 10,432,425 B2* | 10/2019 | Wang | ................. | H04L 12/4625 |
| 10,637,675 B2* | 4/2020 | Wijnands | ............ | H04L 12/1845 |
| 10,958,566 B2* | 3/2021 | Eckert | .................... | H04L 45/28 |
| 2005/0111474 A1* | 5/2005 | Kobayashi | ............ | H04L 49/201 |
| | | | | 370/432 |
| 2008/0212585 A1* | 9/2008 | White | .................... | H04L 45/00 |
| | | | | 370/392 |
| 2008/0307516 A1* | 12/2008 | Levy-Abegnoli | ........................... | |
| | | | | H04L 63/1416 |
| | | | | 726/9 |
| 2009/0225680 A1* | 9/2009 | Cha | .................... | H04L 61/5014 |
| | | | | 370/254 |
| 2011/0103284 A1* | 5/2011 | Gundavelli | ......... | H04W 40/248 |
| | | | | 370/312 |
| 2014/0297875 A1* | 10/2014 | Cheng | .................. | H04L 61/103 |
| | | | | 709/226 |
| 2015/0078379 A1* | 3/2015 | Wijnands | ................ | H04L 45/74 |
| | | | | 370/390 |
| 2015/0078380 A1 | 3/2015 | Wijnands et al. | | |
| 2015/0139228 A1* | 5/2015 | Wijnands | ................ | H04L 45/74 |
| | | | | 370/390 |
| 2016/0065445 A1* | 3/2016 | Du | ...................... | H04L 61/4552 |
| | | | | 370/254 |
| 2016/0142248 A1* | 5/2016 | Thubert | .............. | H04L 61/6004 |
| | | | | 370/392 |
| 2017/0237656 A1* | 8/2017 | Gage | .................. | H04L 61/2521 |
| | | | | 370/392 |
| 2017/0324575 A1* | 11/2017 | Wijnands | ................ | H04L 45/16 |
| 2018/0205636 A1* | 7/2018 | Hu | .......................... | H04L 45/16 |
| 2018/0367456 A1* | 12/2018 | Wijnands | .............. | H04L 45/745 |

FOREIGN PATENT DOCUMENTS

| | | |
|---|---|---|
| CN | 101924701 A | 12/2010 |
| CN | 103338409 A | 10/2013 |
| WO | 2016198022 A1 | 12/2016 |
| WO | WO 2016198022 A1 | 12/2016 |

OTHER PUBLICATIONS

Chunduri et al., "Using Self-defined Sub-TLVs for Agile Service Deployment", Mar. 9, 2015, IETF, Network Working Group, draft-chunduri-ospf-self-defined-sub-tlvs-03, pp. 1-7 (Year: 2015).*
European Patent Office, Extended European Search Report dated Oct. 21, 2020 for EP18771986.9.
Cisco, et al., "Internet Protocol, Version 6 (IPv6) specification" issued on Dec. 1, 1998, Internet Engineering Task Force, IETF; Standard, Internet Society (ISOC) 4.
WIPO, International Search Report dated Apr. 11, 2018.
China Patent Office, First Office Action dated Mar. 26, 2021 regarding CN201710175493.6 and the English translation thereof.

* cited by examiner

FIG. 1

```
Send, by a user side node, a multicast protocol message
or routing protocol message carrying a user side flag to a     S201
              forwarding side node
```

```
Receive, by a user side node, a message forwarded by a
  directly connected forwarding side node and having a         S202
destination address being an address of the user side node
```

INFORMATION TRANSFER METHOD AND DEVICE

CROSS-REFERENCE TO RELATED APPLICATIONS

This is a National Phase Application filed under 35 U.S.C. 371 as a national stage of PCT/CN2018/075927, filed on Feb. 9, 2018, an application claiming the priority of Chinese Patent Application No. 201710175493.6, filed on Mar. 22, 2017, the contents of which are incorporated herein in their entirety by reference.

TECHNICAL FIELD

The present application relates to the field of communications, and especially, to an information transfer method and device.

BACKGROUND

Multicast technology plays an increasingly important role in the current Internet. IPTV (Interactive Personality TV), Net-Meeting, live broadcast, and the like all make use of the multicast technology. Existing multicast technology includes PIM (Protocol Independent Multicast), IGMP (Internet Group Management Protocol), MLD (Multicast Listener Discovery) Protocol, and BIER (Bit Indexed Explicit Replication), etc. OSPF (Open Shortest Path First) protocol and ISIS (Intermediate System-to-Intermediate System) protocol are link-state routing protocols that use a flooding mechanism to advertise various types of information of network nodes; and BGP (Border Gateway Protocol) and Babel Protocol are distance vector protocols that are also used for advertising various types of information of network nodes to form relevant forwarding table entries (forwarding table items). BIER technology is applied to intermediate networks, such as Internet backbones, metropolitan area networks, data centers, or home networks.

The core idea of BIER technology is that each of the nodes at an edge of the network is represented by only one BIT (bit), and multicast traffic is transmitted on an intermediate network with a specific BIER header additionally encapsulated, wherein the packet header labels all destination nodes of the multicast stream in the form of a BIT string, and an intermediate forwarding node routes according to the BIT to ensure that the traffic can be sent to all destination nodes. The intermediate forwarding node floods and sends node information through an internal protocol, such as OSPF, ISIS, BGP, or Babel in a three-layer network, to form a BIFT (Bit Index Forwarding Table) for guiding BIER forwarding, and, upon receiving the traffic with the encapsulated BIER header, completes forwarding of the packet to the destination nodes according to the BIFT.

SUMMARY

The following is a summary of the subject matter described in detail in this disclosure. This summary is not intended to limit the scope of the claims.

In an embodiment of the present disclosure, there is provided an information transfer method and device that can correctly forward a packet upto a user side node.

In an embodiment of the present disclosure, there is provided an information transfer method, including:

sending, by a user side node, a multicast protocol message or routing protocol message carrying a user side flag to a forwarding side node.

The user side flag may be indicated by a newly defined flag bit in the multicast protocol message or the routing protocol message, or by a newly defined TLV in the multicast protocol message or the routing protocol message, or by a newly defined sub-TLV in the multicast protocol message or the routing protocol message.

The step of sending, by the user side node, the multicast protocol message carrying the user side flag to the forwarding side node may include: sending, by the user side node through a multicast protocol, a traffic request carrying the user side flag.

The step of sending, by the user side node, the routing protocol message carrying the user side flag to the forwarding side node may include: advertising, by the user side node through a routing protocol, prefix information with an added user side flag.

The multicast protocol may include at least one of: an MLD protocol, an IGMP, and a PIM protocol.

The routing protocol may include at least one of: a Babel protocol, a BGP, an OSPF protocol, and an ISIS protocol.

The prefix information may include: an IPv6 address for BIER forwarding on an IPv6 network.

In an embodiment of the present disclosure, there is provided an information transfer method, including:

identifying, by a forwarding side node after receiving a multicast protocol message or routing protocol message carrying a user side flag sent from a directly connected user side node, the user side node in a forwarding table; and forwarding a packet to the user side node according to the forwarding table, wherein a destination address of the packet is encapsulated as an address of the user side node.

The user side flag may be indicated by a newly defined flag bit in the multicast protocol message or the routing protocol message, or by a newly defined TLV in the multicast protocol message or the routing protocol message, or by a newly defined sub-TLV in the multicast protocol message or the routing protocol message.

The multicast protocol message may include: a traffic request sent through a multicast protocol; and the multicast protocol may include at least one of: an MLD protocol, an IGMP, and a PIM protocol.

The routing protocol message may include: prefix information advertised through a routing protocol; and the routing protocol may include at least one of: a Babel protocol, a BGP, an OSPF protocol, and an ISIS protocol.

In an embodiment of the present disclosure, there is provided an information transfer device applied to a user side node, including: a first sending module configured to send a multicast protocol message or routing protocol message carrying a user side flag to a forwarding side node.

The user side flag may be indicated by a newly defined flag bit in the multicast protocol message or the routing protocol message, or by a newly defined TLV in the multicast protocol message or the routing protocol message, or by a newly defined sub-TLV in the multicast protocol message or the routing protocol message.

The first sending module may be configured to send a traffic request carrying the user side flag through a multicast protocol, or, advertise prefix information with an added user side flag through a routing protocol.

The multicast protocol may include at least one of: an MLD protocol, an IGMP, and a PIM protocol.

The routing protocol may include at least one of: a Babel protocol, a BGP, an OSPF protocol, and an ISIS protocol.

In an embodiment of the present disclosure, there is provided an information transfer device applied to a forwarding side node, including:

a second receiving module configured to receive a multicast protocol message or routing protocol message carrying a user side flag sent from a directly connected user side node;

a processing module configured to identify the user side node in a forwarding table, after the multicast protocol message or the routing protocol message carrying the user side flag sent from the directly connected user side node is received by the second receiving module; and a second sending module configured to forward a packet to the user side node according to the forwarding table, wherein a destination address of the packet is encapsulated as an address of the user side node.

The user side flag may be indicated by a newly defined flag bit in the multicast protocol message or the routing protocol message, or by a newly defined TLV in the multicast protocol message or the routing protocol message, or by a newly defined sub-TLV in the multicast protocol message or the routing protocol message.

In an embodiment of the present disclosure, there is provided an information transfer device, including: a transmitting module, a memory, and a processor; wherein the memory is configured to store a program for information transfer which, when read and executed by the processor, perform the following operations: transmitting, by the transmitting module, a multicast protocol message or routing protocol message carrying a user side flag to a forwarding side node.

The user side flag may be indicated by a newly defined flag bit in the multicast protocol message or the routing protocol message, or by a newly defined TLV in the multicast protocol message or the routing protocol message, or by a newly defined sub-TLV in the multicast protocol message or the routing protocol message.

In an embodiment of the present disclosure, there is provided an information transfer device, including: a transmitting module, a memory, and a processor; wherein the memory is configured to store a program for information transfer which, when read and executed by the processor, causes the following operations to be performed:

identifying, after the transmitting module receives a multicast protocol message or routing protocol message carrying a user side flag sent from a directly connected user side node, the user side node in a forwarding table; and forwarding a packet to the user side node according to the forwarding table, wherein a destination address of the packet is encapsulated as an address of the user side node.

The user side flag may be indicated by a newly defined flag bit in the multicast protocol message or the routing protocol message, or by a newly defined TLV in the multicast protocol message or the routing protocol message, or by a newly defined sub-TLV in the multicast protocol message or the routing protocol message.

In addition, in an embodiment of the present disclosure, there is further provided a non-transitory computer-readable medium storing a plurality of instructions which, when executed by one or more processors, implement the information transfer method according the first aspect as described above.

In an embodiment of the present disclosure, there is further provided a non-transitory computer-readable medium storing a plurality of instructions which, when executed by one or more processors, implement the information transfer method according the second aspect as described above.

In the embodiments of the present application, when a user side node sends a traffic request through an MLD, IGMP or PIM protocol, or sends prefix information through routing protocols such as Babel, BGP, OSPF, ISIS and the like, a forwarding side node can clearly know, by a manner of adding a user side flag, whether the user side node is connected. When performing forwarding according to a BIER rule, the forwarding side node can identify the user side node and encapsulate a message to have a correct destination address to be sent, so as to ensure that the user side node can correctly receive a traffic message. Therefore, the correct application of BIER technology in IPv6 network is realized, which plays an important role in promoting the development of multicast technology and network.

Other aspects will become apparent upon reading and understanding the drawings and detailed description.

DETAILED DESCRIPTION

Hereinafter, embodiments of the present application will be described with respect to the accompanying drawings. It should be understood that the embodiments as set forth herein are merely for the purpose of illustration and explanation of the present application and should not be interpreted as a limitation thereof.

The steps illustrated in the flowchart of the drawings may be executed in a computer system such as a set of computer executable instructions. Also, although a logical order is shown in the flowchart, in some cases, the steps shown or described may be performed in a different order than illustrated herein.

In the scenario of an IPv6 (Internet Protocol Version 6) network, the BIER technology may be directly applied to an IPv6 header, in which a bit string for BIER forwarding is directly encapsulated in an IPv6 address by defining and modifying a field of the IPv6 header; and an intermediate forwarding node, by identifying a particular IPv6 address, reads the bit string embedded therein and performs forwarding according to the bit string. The greatest advantage of this method is directly using the IPv6 header without attaching an additional BIER header to the packet, so there is no need to worry about the problem of packet fragmentation. However, in actual scenarios, when the intermediate forwarding node is connected with a plurality of user side nodes, or when there is an interface which is connected to both a user side node and another intermediate forwarding node, a problem that the packet cannot be received by the user side node correctly may occur due to failure in identifying the user side node. In addition, as a receiver-to-first-hop forwarding device operating protocol developed for many years, MLD/IGMP cannot distinguish explicitly whether a report packet is sent from a host or a receiver, or sent from a forwarding device such as a router or a switch. Therefore, MLD/IGMP itself cannot solve the above problem. PIM technology and other routing protocol technologies (including Babel, OSPF, ISIS, BGP, etc.) also have the same problem.

Figure 1:
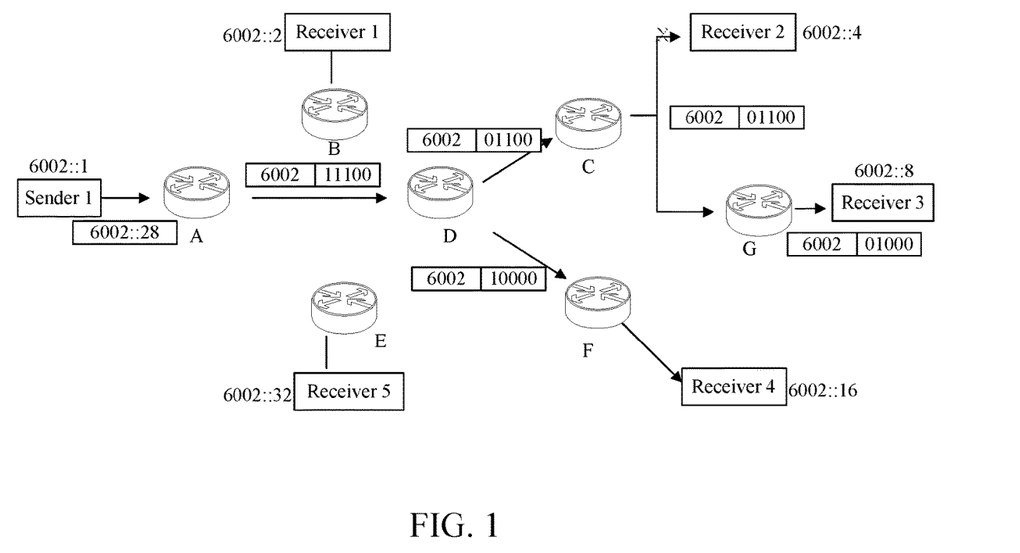
FIG. 1 is a schematic diagram showing the BIER technology applied to an IPv6 network.

FIG. 1 shows a typical network in which the multicast technology is applied. In addition to a device sending source traffic (Sender 1), this network further includes a receiver (for example, Receivers 1 to 5). Both the receiver and the sender are identified by a particular IPv6 address. It is assumed here that the entire network is configured or otherwise known that an IPv6 prefix 6002::/48 is used for identifying a particular IPv6 address. It can be seen that from Sender 1 to each of the Receivers, each has an IPv6 address with a prefix of 6002, followed by a non-coincident bit for identification. For example, the addresses of Receiver 1, Receiver 2, and Receiver 3 are 6002::2, 6002::4, and 6002::8, respectively, where each of the prefixes is followed by a non-coincident bit; the same manner is applied to the addresses of Receiver 4 and Receiver 5, 6002::16 and 6002::32. Thus, an intermediate forwarding device can form BIER forwarding table entries based on these bits. Assuming that the BIER forwarding table of the intermediate network has been established, and there is now traffic to be sent to three user side nodes, Receiver 2, Receiver 3 and Receiver 4. The user side node Receiver 2 and a forwarding side node G are on the same shared network, and both connected to a forwarding side node C. When the source sends a packet and the destination address of the packet is 6002::28, then 28 identifies three bits corresponding to Receiver 2, Receiver 3, and Receiver 4 (28=4+8+16). According to the previously established BIER forwarding table in the network, it can be known that the packet transmission path is: Sender 1→A→D→C→G/Receiver 2→Receiver 3, A→D→F→Receiver 4. At the forwarding side node C, the packet will be sent to Receiver 2 and the forwarding node G. According to the BIER forwarding principle, when the packet is forwarded from the node D to the node C, the carried destination address of the packet is 6002::12, indicating that the destinations are 6002::4 and 6002::8 (12=4+8). The node C sends the packet to Receiver 2 and the forwarding node G. Since Receiver 2 and node G are in the same shared network, the node C sends the packet, according to the BIER forwarding principle, to the destination address 6002::12 of the packet header on the shared network connected to Receiver 2 and the forwarding node G. Then, the forwarding node G can, according to the BIER forwarding table and the BIER forwarding rule of its own, process the packet correctly and forward it to Receiver 3 which is connected to the forwarding node G. However, for the same packet, since Receiver 2 is a user side node that cannot process like the forwarding node G, Receiver 2 will consider that the packet is not intended to be sent to Receiver 2 because the destination address of the packet is 6002::12 instead of the address of Receiver 2, i.e., 6002::4, thereby Receiver 2 will discard the packet.

In FIG. 1, the reason why the forwarding node C cannot forward the packet to Receiver 2 normally lies in that: the forwarding node C does not know that the packet will be sent to the receiver, and thus the forwarding node C only processes according to normal BIER forwarding, thereby causing the receiver (Receiver 2) to, after receiving the packet, discard the packet or fail to receive the packet normally because the destination address therein is not a local address.

The user side and the forwarding side mentioned in the present application will now be explained below.

A user side generally refers to a receiver node or host node side, and may also refer to a forwarding node with host behavior. In the current environment where network virtualization technology is widely used, a user side node may be either a physical device or a virtual module. A primary responsibility of the user side node is to send information and demands, wherein information and demands may be sent together. For example, when a multicast report packet is sent through a protocol such as MLD or IGMP, main information of the user side node (such as an IP address) will be sent with the protocol packet while carrying the multicast group request of the user, and the forwarding side node can receive, identify and process the information.

A forwarding side is also called a network side, or a router side, the main work objective of which is to collect information and demands sent from the user side; wherein the information may include, for example, an address of the receiving node or the host node, and the demands may include multicast traffic that the receiving node or the host node expect to receive. After collecting these contents, the forwarding side requests to obtain such traffic from a higher-level network, and then forward the obtained traffic to the user side. Likewise, in the current environment where network virtualization technology is widely used, a forwarding side node may be either a physical device or a virtual module.

Figure 2:
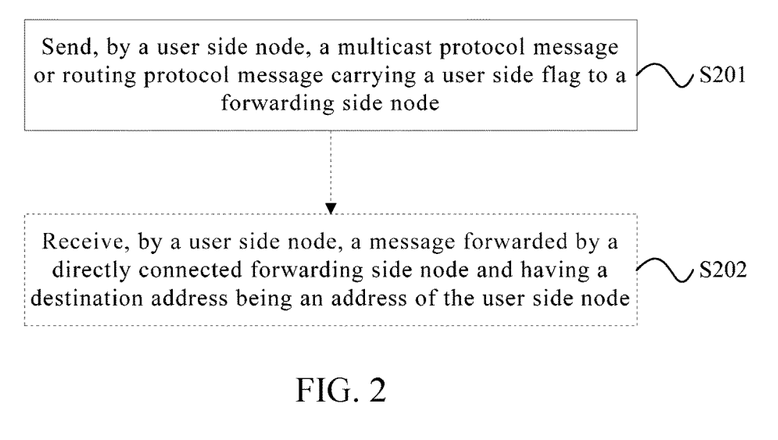
FIG. 2 is a flowchart of an information transfer method according to an embodiment of the present application.

As shown in FIG. 2, in an embodiment, there is provided an information transfer method which is applied to a user side node, and includes a step S201.

At S201, sending, by a user side node, a multicast protocol message or routing protocol message carrying a user side flag to a forwarding side node.

The user side flag may be indicated by a newly defined flag bit in the multicast protocol message or the routing protocol message, or by a newly defined Type Length Value (TLV) in the multicast protocol message or the routing protocol message, or by a newly defined sub-TLV in the multicast protocol message or the routing protocol message.

The step S201 may include:

sending, by the user side node through a multicast protocol, a traffic request carrying the user side flag; or advertising, by the user side node through a routing protocol, prefix information with an added user side flag.

The multicast protocol may include at least one of: an MLD protocol, an IGMP, and a PIM protocol; and the routing protocol may include at least one of: a Babel protocol, a BGP, an OSPF protocol, and an ISIS protocol.

The prefix information may include: an IPv6 address for BIER forwarding on an IPv6 network. However, the present application is not limited thereto. In other embodiments, the prefix information may include a normal IP address.

After step S201, the information transfer method of this embodiment may further include a step S202.

At step S202, receiving, by the user side node, a packet forwarded by a directly connected forwarding side node, a destination address of the packet being an address of the user side node.

In this embodiment, when sending a traffic request or information such as a prefix, the user side node may declare that the user side node itself is a receiving node or host, wherein the declaring manner may be: indicating a user side flag by extending a flag bit of the protocol, or representing a user side flag through protocol extension. When sending an MLD or IGMP report message to declare the traffic request, the user side node may add a flag bit declaring that the user side node is a receiving node or host, so that a packet sent from the user side node is distinguished from that of the forwarding side node. A user side flag may also be introduced when the user side node sends a traffic request through a PIM protocol. Likewise, when the user side node advertises address prefix information thereof through a routing protocol (for example, Babel, BGP, OSPF, ISIS, etc.), a flag bit may added into the prefix information for a distinguishing purpose, or, a TLV or sub-TLV may be added to function as the flag bit.

Figure 3:
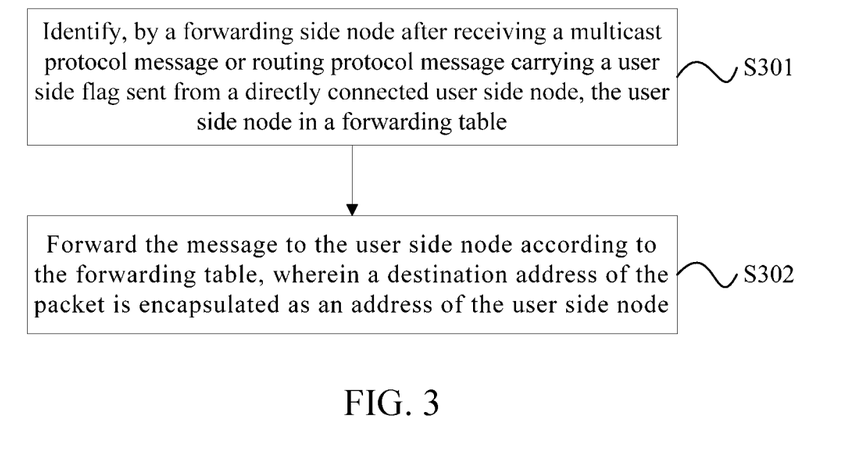
FIG. 3 is a flowchart of another information transfer method according to an embodiment of the present application.

As shown in FIG. 3, in an embodiment, there is provided an information transfer method which is applied to a forwarding side node and includes steps S301 and S302.

At step S301, identifying, by a forwarding side node after receiving a multicast protocol message or routing protocol message carrying a user side flag sent from a directly connected user side node (i.e. a user side node directly connected to the forwarding side node), the user side node in a forwarding table;

At S302, forwarding a packet to the user side node according to the forwarding table, wherein a destination address of the packet is encapsulated as an address of the user side node.

The user side flag may be indicated by a newly defined flag bit in the multicast protocol message or the routing protocol message, or by a newly defined TLV in the multicast protocol message or the routing protocol message, or by a newly defined sub-TLV in the multicast protocol message or the routing protocol message.

The multicast protocol message may include: a traffic request sent through a multicast protocol; and the multicast protocol may include at least one of: an MLD protocol, an IGMP, and a PIM protocol; and the routing protocol message may include: prefix information advertised through a routing protocol; and the routing protocol may include at least one of: a Babel protocol, a BGP, an OSPF protocol, and an ISIS protocol.

In this embodiment, after receiving the prefix information or the traffic request carrying the user side flag sent from a user side node, the forwarding side node parses the received information. If the forwarding side node finds a user side flag carried by the information, the forwarding side node flags (marks) a corresponding entry (item) in the forwarding table to identify a user side node directly connected to the forwarding side node. When a packet required by the directly connected user side node is received and forwarded, the forwarding side node encapsulates a destination of the packet header according to the marked entries, that is, a destination address of the packet is encapsulated as an address of the user side node, so as to forward the packet to the user side node correctly.

It is noted that besides the directly connected user side node, if there is another forwarding side node in the forwarding table that needs to receive the packet, the packet is further forwarded to the another forwarding side node according to the forwarding rule in addition to being separately encapsulated as the address of the directly connected user side node and forwarded to the user side node.

The solution of the present application will be described below by way of a plurality of exemplary examples.

EXAMPLE I

Figure 4:
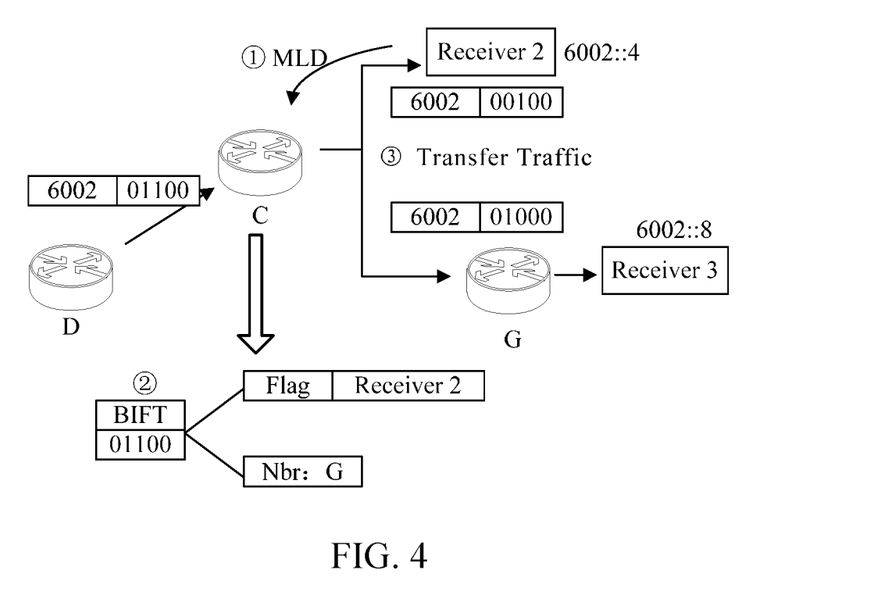
FIG. 4 is a schematic diagram of Example I of the present application.

This example still takes the problem in the network of FIG. 1 as an example, and focuses on the processing procedure between the forwarding node C and Receiver 2. As shown in FIG. 4, it is assumed that the protocol interaction between the user side and the forwarding side is an MLD protocol. A routing protocol such as OSPF, ISIS, BGP, or Babel is executed between the forwarding nodes to perform BIER information exchange, so as to form a BIER forwarding table, wherein no user side flag is carried during BIER information exchange between the forwarding nodes through the routing protocol.

At step 1, when sending an MLD report message to the forwarding side, Receiver 2 on the user side carries therein not only a request for the multicast traffic information to be received by Receiver 2, but also a user side flag. An address of Receiver 2 on the user side may be obtained through a source address of the MLD protocol packet sent from Receiver2, or may be obtained through the information carried by a route prefix, etc.

At step 2, when forming forwarding table entries, the node C on the forwarding side processes the forwarding table entries with a particular flag (performs flagging process) according to the user side flag, and the destination Receiver 2 included in the entries will be an IPv6 address of the user side node, which is 6002::4 in the example of FIG. 1. Meanwhile, the forwarding table entries further includes an entry that is to be normally forwarded to the next forwarding side node (that is to say, the next hop is the node G), but there is no user side flag in such entry.

At step 3, if the forwarding side node C, after receiving the multicast traffic to be forwarded, looks up the forwarding table and finds a user side flag in the forwarding table entries, the forwarding side node C encapsulates the traffic according to a destination IP in the forwarding table entries, that is, separately encapsulates the destination address of the packet as 6002::4, and then sends the packet onto a shared network interface connected to both Receiver 2 and the forwarding node G. When Receiver 2 receives the packet and finds that the destination address of the packet is Receiver 2 itself, Receiver 2 will receive the packet correctly. Meanwhile, if the forwarding side node C finds that the packet also needs to be forwarded to a next neighbor node without any user side flag, the forwarding side node C will process and forward the packet according to a normal BIER forwarding procedure. As a result, the packet will be encapsulated normally with a destination address 6002::12 and forwarded to the node G according to the procedure. Then, the node G will forward the packet correctly to Receiver 3 according to its own forwarding table.

When the node C forwards the packet to the node G, the node C may remove a bit corresponding to Receiver 2 from the packet encapsulation since the node C has already sent the packet to Receiver 2, i.e., the node C may only send 6002::8 to the node G, as shown in FIG. 4. This removal is optional and will not affect the processing at the next forwarding node G.

Therefore, Receiver 2 can receive multicast traffic with a destination address of Receiver 2 itself, and thus implements a correct procedure of receiving multicast traffic.

Likewise, the same processing procedure may be performed in other parts of FIG. 1, i.e., between the user side Receiver 1 and the forwarding node B, between the user side Receiver 3 and the forwarding node G, between the user side Receiver 4 and the forwarding node F, and between the user side Receiver 5 and the forwarding node E, thereby realizing correct receipt of the multicast traffic.

If a PIM protocol is executed between the user side node and the forwarding side node, the same protocol extension may be performed in which a user side flag is added into a join message of PIM. The related processing procedure is similar to the above and therefore could reach the same effect.

EXAMPLE II

Figure 5:
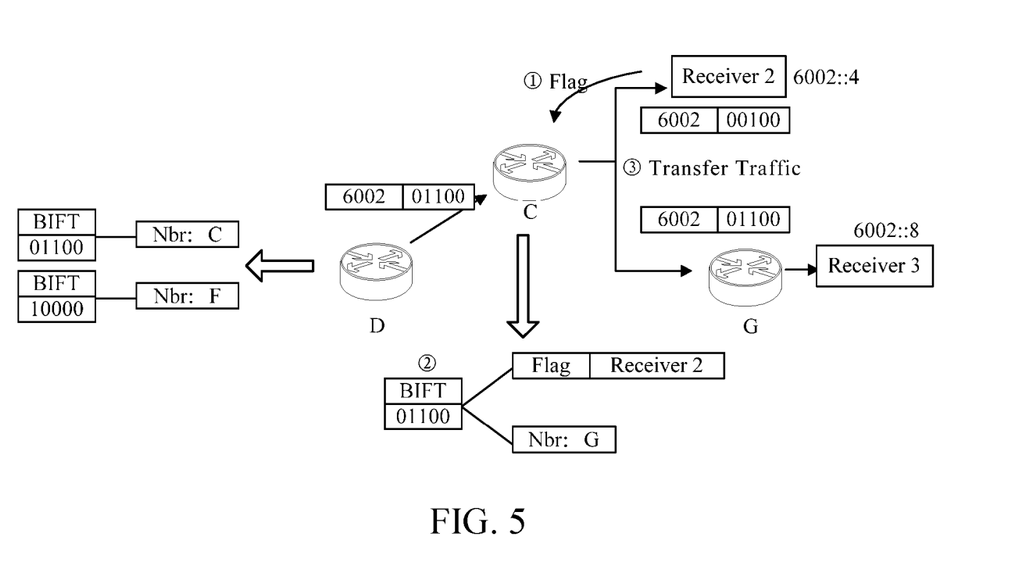
FIG. 5 is a schematic diagram of Example II of the present application.

This example also takes the network shown in FIG. 1 as an example, wherein there is no IGMP or MLD protocol between the user side and the forwarding side for user side access. Instead, the entire network executes a routing protocol to implement interconnection. Similarly, an excerpted local interaction process is as shown in FIG. 5, in which Receiver 2 carries a user side flag when advertising its own prefix information 6002::4 to the network using the routing protocol. According to a mutual advertisement mechanism of each routing protocol in the network, such as BGP or Babel prefix advertisement, or OSPF or ISIS flooding, each node in the network receives the prefix information and generates BIER forwarding table entries related thereto.

In the BIER forwarding table generated by the forwarding node C, since the prefix of Receiver 2 comes from a directly connected neighbor node and carries the user side flag, the forwarding table entries on the forwarding node C will have a particular flag indicating that there is a user side receiver whose address is Receiver 2. Also, due to the presence of neighbor node G, a normal BIER forwarding is also required for neighbor node G.

It is noted that the use of a flooding mechanism such as OSPF or ISIS will cause the prefix information with the user side flag to be received also by other forwarding nodes (such as the forwarding node D, etc.). Here, taking the forwarding node D as an example, the forwarding node D, when processing such prefix information, finds that the prefix of Receiver 2 is routed to the node C in the next hop, that is, the forwarding node D finds that the forwarding node D itself and Receiver 2 are not directly connected. As a result, when generating BIER forwarding table entries, the forwarding node D does not add a user side flag to the routing forwarding table entries directed to the prefix of Receiver 2, as shown in FIG. 5. Likewise, the forwarding node C also receives the prefix information with a user side flag of Receiver 3 forwarded or flooded by the forwarding node G. However, because the forwarding node C is not directly connected to Receiver 3, the forwarding node C generates a particular forwarding item with a user side flag for Receiver 2, but does not generate a particular forwarding item with a user side flag for Receiver 3.

On the other hand, if a non-flooding protocol such as BGP or Babel is used, the BGP or Babel may choose to transfer the prefix information to other nodes with the user side flag unchanged, which is similar to the processing of OSPF or ISIS. Alternatively, the BGP or Babel may choose to remove the user side flag information when forwarding the prefix information to other nodes. For example, when forwarding the prefix information of Receiver 2 to the node D, the forwarding node C may remove the user side flag so that the node D will not generate, due to the prefix information of Receiver 2 that is not directly connected, a particular forwarding item with a user side flag. Likewise, when forwarding the prefix information of Receiver 3 to the node C, the node G may choose to remove the user side flag so that the node C will not generate, due to the prefix information of Receiver 3 that is not directly connected, a particular forwarding item with a user side flag.

Therefore, when the node D receives a packet with an encapsulated destination 6002::28, the node D processes the packet according to the BIER forwarding table entries, sends a packet with a destination address 6002::16 to a neighbor node F, and sends a packet with a destination address of 6002::12 to the node C. Based on the BIER forwarding table entries, the node C finds that the item sent to Receiver 2 has a user side flag. Therefore, the destination of the packet is encapsulated according to the address of Receiver 2 in the entries. At this time, the destination address is 6002::4, and the packet is sent to a link between Receiver 2 and the node G. The node G neglects the packet according to the existing BIER forwarding principle so that Receiver 2 receives the packet correctly. Then, the node C sends a packet 6002::12 to the link between Receiver 2 and the node G according to the forwarding item without any user side flag, as shown in FIG. 5. The packet will be neglected by Receiver 2 and forwarded by the node G to Receiver 3 according to the BIER forwarding principle.

After forwarding the user side flag entries, the node C may further forward the packet to the same shared link according to the BIER forwarding principle, or may choose to remove a bit, which is the same as the forwarded user side flag, from the packet header. That is, when sending the packet to the node G, the node C may modify the packet header to 6002::8 before sending.

EXAMPLE III

Figure 6:
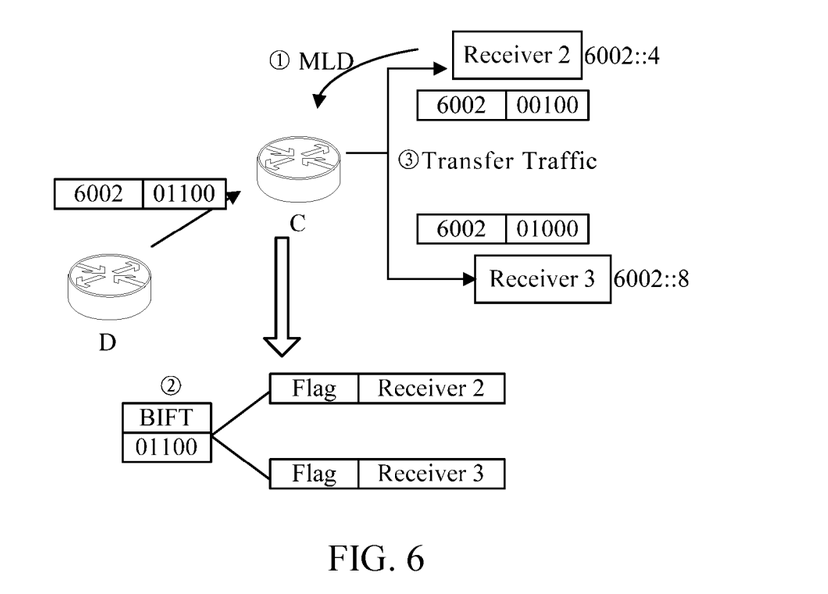
FIG. 6 is a schematic diagram of Example III of the present application.

FIG. 6 shows an excerpt network, wherein two user side nodes, Receiver 2 and Receiver 3, exist on a shared network connected to the forwarding side node C. According to an IPv6 BIER forwarding principle, when the solution of the present application is not applied, the forwarding node C sends a packet with an encapsulated destination address 6002::12 to the shared network, and both user side nodes Receiver 2 and Receiver 3 will discard the packet because the destination address of the packet is not their own addresses.

When the solution of the present application is applied, the user side nodes Receiver 2 and Receiver 3 carry a user side flag when using an MLD or PIM protocol to send a multicast stream requesting a packet, or using a Babel, BGP, OSPF, or ISIS protocol to send prefix information of their own, whereby the forwarding node C form BIER forwarding table entries with a particular flag, as shown in FIG. 6.

When the multicast data stream is sent to the forwarding node C, the forwarding node C finds a user side node Receiver 2 connected to the forwarding node C after looking up the forwarding table entries. Then, the forwarding node C encapsulates 6002::4 as the destination address according to the forwarding table entries with the particular flag and sends the multicast data stream so that Receiver 2 can receive the multicast data stream normally. Similarly, the forwarding node C encapsulates 6002::8 as the destination address according to the user side flag in the entry and forwards the multicast data stream, and Receiver 3 can receive the multicast data stream normally.

Therefore, when an interface of the forwarding node is connected with a plurality of user side nodes, correct forwarding of the packet is realized, and thus it is ensured that each of the user side node can receive a multicast data stream packet normally.

EXAMPLE IV

This example shows how the user side flag is carried.

Figure 7:
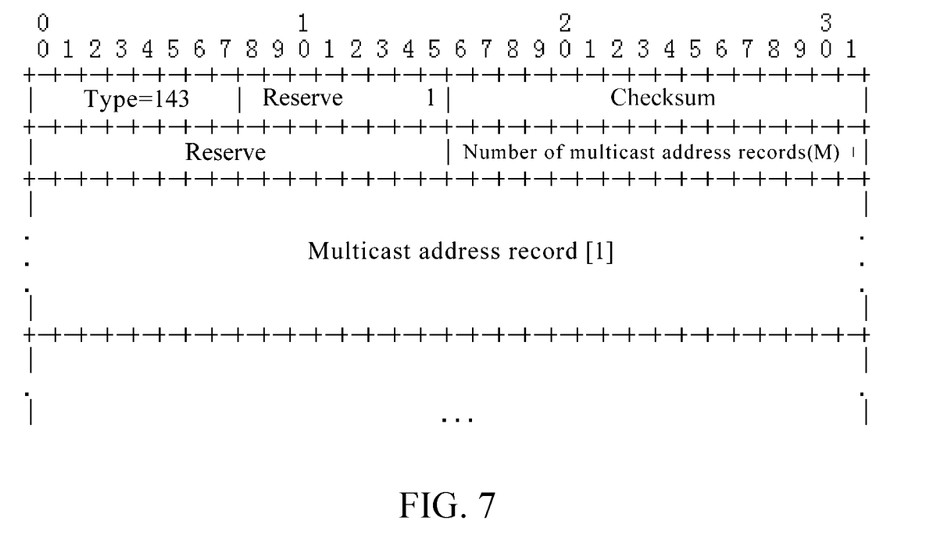
FIG. 7 is schematic diagram I of a packet format according to an embodiment of the present application.
Figure 8:
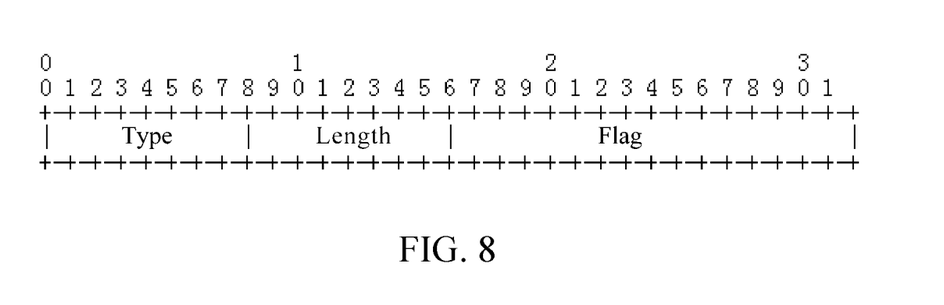
FIG. 8 is schematic diagram II of a packet format according to an embodiment of the present application.
Figure 9:
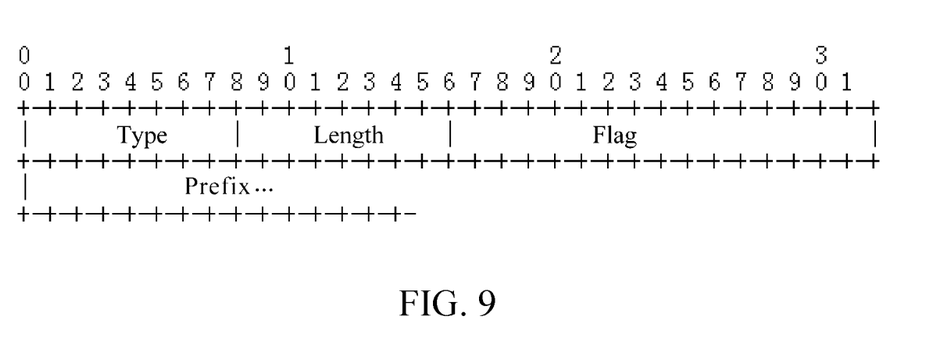
FIG. 9 is schematic diagram III of a packet format according to an embodiment of the present application.

When a protocol such as MLD, IGMP, or PIM is used as the protocol for the user side to interact with the forwarding side, a user side flag may be indicated by extension in a MLD or IGMP Report packet. As shown in FIG. 7, it is possible to define one bit in a reserved field (such as the last bit in the reserved field) of the MLD Report packet to represent the user side flag. Alternatively, as shown in FIG. 8, the extension may be implemented by defining a new TLV, with a particular flag bit of the new TLV representing a user side flag. Alternatively, as shown in FIG. 9, the extension may be implemented by a manner of specifically adding a TLV with a particular prefix with a user side flag.

For a scenario where a PIM protocol is used as an interaction protocol between the user side and network side, it may be implemented by extending a join packet of PIM. The extension format or manner is similar to the above and will not be repeated here.

Figure 10:
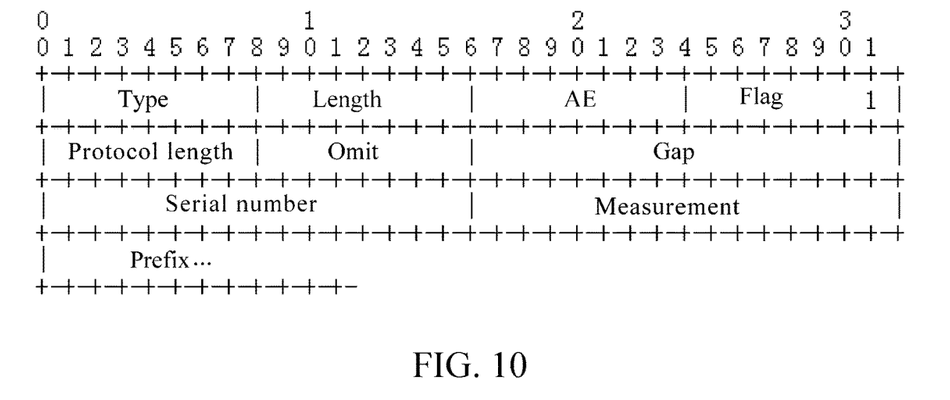
FIG. 10 is schematic diagram IV of a packet format according to an embodiment of the present application.

When the user side flag is transferred using a Babel, BGP, OSPF, or ISIS protocol, the user side flag may be identified by defining a new bit in the unused flag bits or reserved fields during prefix advertisement of these protocols. For example, in the Babel protocol, the user side flag may be indicated by newly defining a bit in the flag of the prefix advertisement update message, as shown in FIG. 10. Likewise, for BGP, OSPF, or ISIS protocols, the new bit may be defined in a similar manner. Alternatively, the user side flag may be represented by adding a TLV or a sub-TLV, which has a form similar to that of FIGS. 8 and 9, and thus will not be repeated here.

According to the description of the above examples, by a manner of adding a user side flag, when the user side node sends a traffic request through the MLD, IGMP, or PIM protocol, or sends prefix information through routing protocols such as Babel, BGP, OSPF, or ISIS and the like, a forwarding node can clearly know whether the user side node is connected to the forwarding node; and when the forwarding side node performs forwarding according to a BIER rule, the forwarding side node can identify the user side node and encapsulate a packet to have a correct destination address to be sent, so as to ensure that the user side node can receive the traffic packet correctly when the forwarding node is connected with a plurality of user side nodes, or connected with both a user side node and a forwarding side node. The present application guarantees the correct application of BIER technology of IPv6, expands the application scope and scenarios of BIER technology, and plays an important role in promoting the development of multicast technology and network.

Figure 11:
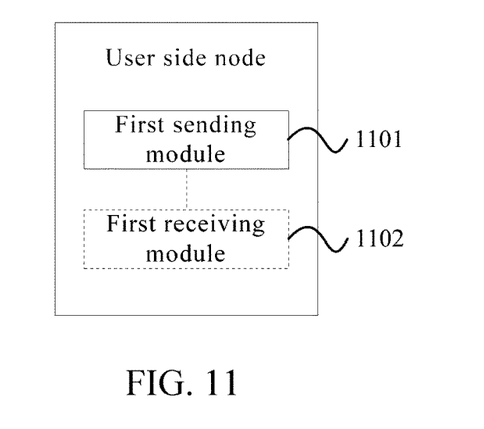
FIG. 11 is a schematic diagram of an information transfer device according to an embodiment of the present application.

As shown in FIG. 11, in an embodiment of the present disclosure, there is further provided an information transfer device applied to a user side node, the device including:

a first sending module 1101 configured to send a multicast protocol message or routing protocol message carrying a user side flag to a forwarding side node.

The user side flag may be indicated by a newly defined flag bit in the multicast protocol message or the routing protocol message, or by a newly defined TLV in the multicast protocol message or the routing protocol message, or by a newly defined sub-TLV in the multicast protocol message or the routing protocol message.

The first sending module 1101 may be configured to send a traffic request carrying the user side flag through a multicast protocol, or, advertise prefix information with an added user side flag through a routing protocol.

The multicast protocol may include at least one of: an MLD protocol, an IGMP, and a PIM protocol; and the routing protocol may include at least one of: a Babel protocol, a BGP, an OSPF protocol, and an ISIS protocol.

The information transfer device of this embodiment may further include:

a first receiving module 1102 configured to receive a packet forwarded by a forwarding side node directly connected to the user side node and having a destination address being an address of the user side node.

For description of the device in this embodiment, reference may be made to the description of the corresponding method embodiment of FIG. 2, and thus will not be repeated here.

Figure 12:
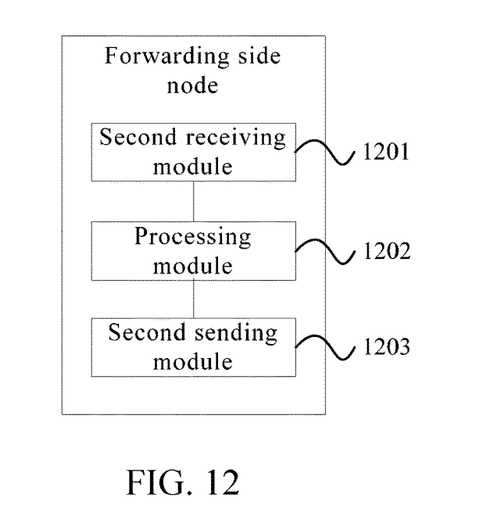
FIG. 12 is a schematic diagram of another information transfer device according to an embodiment of the present application.

As shown in FIG. 12, in an embodiment of the present disclosure, there is further provided an information transfer device applied to a forwarding side node, including:

a second receiving module 1201 configured to receive a multicast protocol packet or routing protocol packet carrying a user side flag sent from a directly connected user side node;

a processing module 1202 configured to identify, after the second receiving module 1201 receives the multicast protocol message or the routing protocol message carrying the user side flag sent from the directly connected user side node, the user side node in a forwarding table; and a second sending module 1203 configured to forward a packet to the user side node according to the forwarding table, wherein a destination address of the packet is encapsulated as an address of the user side node.

The user side flag may be indicated by a newly defined flag bit in the multicast protocol message or the routing protocol message, or by a newly defined TLV in the multicast protocol message or the routing protocol message, or by a newly defined sub-TLV in the multicast protocol message or the routing protocol message.

For description of the device provided in this embodiment, reference may be made to the description of the corresponding method embodiment of FIG. 3, and thus will not be repeated here.

Figure 13:
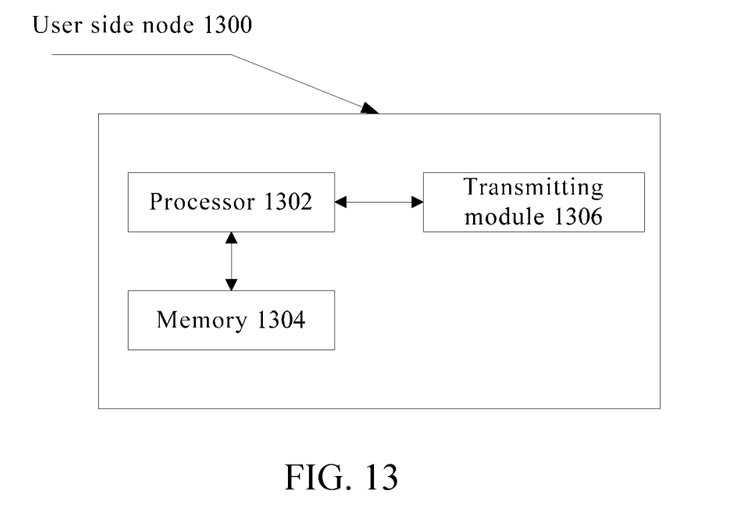
FIG. 13 is a schematic structural diagram of a user side node for implementing the information transfer method according to an embodiment of the present application.

As shown in FIG. 13, in an embodiment of the present disclosure, there is further provided an information transfer device applied to a user side node 1300, the device including: a transmitting module 1306, a memory 1304, and one or more processors 1302 (only one shown in the figure); wherein the memory 1304 is configured to store a program for information transfer which, when read and executed by the processor 1302, causes the following operation to be performed: transmitting, by the transmitting module 1306, a multicast protocol message or routing protocol message carrying a user side flag to a forwarding side node.

The processor 1302 may include, but is not limited to, a microprocessor (e.g. MCU) or a processing device of a programmable logic device (e.g. FPGA) or the like.

It will be understood by those ordinary skilled in the art that the structure shown in FIG. 13 is merely illustrative, and does not form any limitation to the structure of the above electronic device. For example, the user side node 1300 may include more or fewer components than those shown in FIG. 13, or have a different configuration than that shown in FIG. 13.

The memory 1304 may be configured to store software programs and modules of application software, such as program instructions/modules corresponding to the information transfer method in the present disclosure. The processor 1302 executes the software programs and modules stored in the memory 1304 to perform various functional applications and data processing, that is, to implement the above method. The memory 1304 may include a high speed random access memory and may also include a non-volatile memory such as one or more magnetic storage device, flash memory, or other non-volatile solid state memory. In some examples, the memory 1304 may further include a memory remotely located relative to the processor 1302, which may be connected to the user side node 1300 via a network. Examples of such networks include, but are not limited to, the Internet, intranets, local area networks, mobile communication networks, and combinations thereof.

The transmitting module 1306 is configured to receive or transmit data via a network. In an example, the transmitting module 1306 may be a Radio Frequency (RF) module configured to communicate with the Internet wirelessly.

Figure 14:
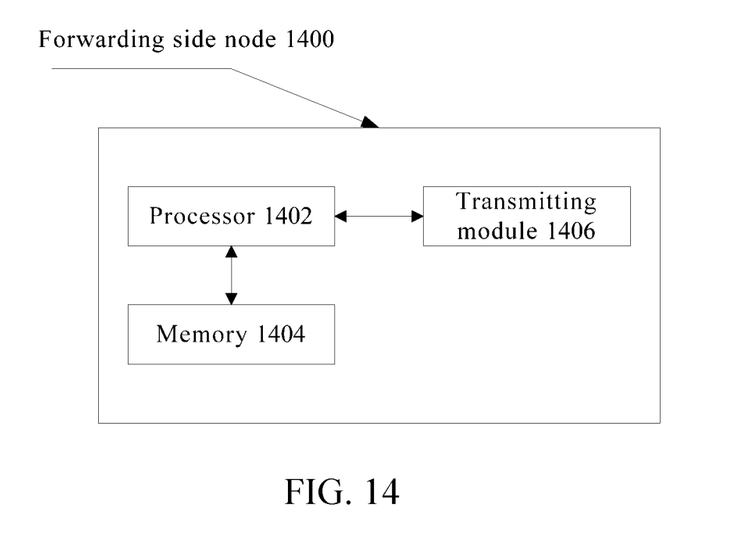
FIG. 14 is a schematic structural diagram of a forwarding side node for implementing the information transfer method according to an embodiment of the present application.

As shown in FIG. 14, in an embodiment of the present disclosure, there is further provided an information transfer device applied to a forwarding side node 1400, the device including: a transmitting module 1406, a memory 1404, and one or more processors 1402 (only one shown in the figure); wherein the memory 1404 is configured to store a program for information transfer which, when read and executed by the processor 1402, causes the following operations to be performed:

identifying, after the transmitting module 1406 receives a multicast protocol message or routing protocol message carrying a user side flag sent from a directly connected user side node, the user side node in a forwarding table; and forwarding a packet to the user side node according to the forwarding table, wherein a destination address of the packet is encapsulated as an address of the user side node.

The processor 1402 may include, but is not limited to, an MCU or a processing device of an FPGA or the like.

It will be understood by those ordinary skilled in the art that the structure shown in FIG. 14 is merely illustrative, and does not form any limitation to the structure of the above electronic device. For example, the forwarding side node may include more or fewer components than those shown in FIG. 14, or have a configuration different from that shown in FIG. 14.

The memory 1404 may be configured to store software programs and modules of application software, such as program instructions/modules corresponding to the information transfer method in the embodiment of the present disclosure. The processor 1402 executes the software programs and modules stored in the memory 1404 to perform various functional applications and data processing, that is, implement the above method. The memory 1404 may include a high speed random access memory and may also include a non-volatile memory such as one or more magnetic storage device, flash memory, or other non-volatile solid state memory. In some examples, the memory 1404 may further include a memory remotely located relative to the processor 1402, such remote memory may be connected to the forwarding side node 1400 via a network. Examples of such networks include, but are not limited to, Internet, intranets, local area networks, mobile communication networks, and combinations thereof.

The transmitting module 1406 is configured to receive or transmit data via a network. In an example, the transmitting module 1406 may be a Radio Frequency (RF) module configured to communicate with the Internet wirelessly.

In addition, in an embodiment of the present disclosure, there is further provided a non-transitory computer-readable medium storing a plurality of instructions which, when executed by one or more processors, implement the information transfer method on the user side.

In an embodiment of the present disclosure, there is further provided a non-transitory computer-readable medium storing a plurality of instructions which, when executed by one or more processors, implement the information transfer method on the forwarding side.

Those of ordinary skill in the art will appreciate that all or some steps of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or step may be performed cooperatively by several physical components. Some or all components may be implemented as software executed by a processor, such as a digital signal processor or microprocessor, or implemented as hardware, or implemented as an integrated circuit, such as an application specific integrated circuit. Such software may be distributed on a computer readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those skilled in the art that communication medium typically includes a computer readable instruction, a data structure, a program module, or other data in a modulated data signal, such as a carrier wave or other transport mechanism, and may include any information delivery medium.

Despite the implementations disclosed in the present disclosure as described above, they are merely implementations used to facilitate the understanding of the present disclosure, and are not intended to limit the present disclosure. Any modification and variation in the form and details of the embodiments can be made by any person skilled in the art of the present disclosure without departing from the spirit and scope disclosed by this disclosure. However, the scope of protection of this disclosure is defined by the scope of the appended claims.

INDUSTRIAL APPLICABILITY

In the embodiments of the present application, when a user side node sends a traffic request through an MLD, IGMP or PIM protocol, or sends prefix information through routing protocols such as Babel, BGP, OSPF, ISIS and the like, a forwarding side node can clearly know, by a manner of adding a user side flag, whether the user side node is connected. When performing forwarding according to a BIER rule, the forwarding side node can identify the user side node and encapsulate a packet to have a correct destination address to be sent, so as to ensure that the user side node can correctly receive a traffic packet. Therefore, the correct application of BIER technology in IPv6 network is realized, which plays an important role in promoting the development of multicast technology and network.

What is claimed is:

1. An information transfer method, comprising:
    sending, by a user side node, a multicast protocol message or routing protocol message carrying a user side flag to a forwarding side node;
    wherein, the user side flag is used for indicating that the message carrying the user side flag is sent from a user side node rather than a forwarding side node, so that the forwarding side node could forward a packet to the user side node according to an address of the user side node;
    wherein the step of sending, by the user side node, the multicast protocol message carrying the user side flag to the forwarding side node comprises: sending, by the user side node through a multicast protocol, a traffic request carrying the user side flag; and
    the step of sending, by the user side node, the routing protocol message carrying the user side flag to the forwarding side node comprises: advertising, by the user side node through a routing protocol, prefix information with an added user side flag.

2. The method according to claim 1, wherein the user side flag is indicated by a flag bit defined in the multicast protocol message or the routing protocol message, or by a Type Length Value (TLV) defined in the multicast protocol message or the routing protocol message, or by a sub-TLV defined in the multicast protocol message or the routing protocol message.

3. The method according to claim 1, wherein the multicast protocol comprises at least one of: a Multicast Listener Discovery (MLD) protocol, an Internet Group Management Protocol (IGMP), and a Protocol Independent Multicast (PIM) protocol; and the routing protocol comprises at least one of: a Babel protocol, a Border Gateway Protocol (BGP), an Open Shortest Path First (OSPF) protocol, and an Intermediate System-to-Intermediate System (ISIS) protocol.

4. The method according to claim 1, wherein the prefix information comprises: an Internet Protocol Version 6 (IPv6) address for Bit Index Explicit Replication (BIER) forwarding on an IPv6 network.

5. An information transfer device, comprising: a memory, and a processor; wherein the memory is configured to store a program for information transfer which, when read and executed by the processor, implement the information transfer method according to claim 1.

6. A non-transitory computer-readable medium storing a plurality of instructions which, when executed by one or more processors, implement the information transfer method according to claim 1.

7. An information transfer method, comprising:
    identifying, by a forwarding side node, a user side node in a forwarding table after a multicast protocol message or routing protocol message carrying a user side flag sent from a directly connected user side node is received by the forwarding side node; and
    forwarding a packet to the user side node according to the forwarding table, wherein a destination address of the packet is encapsulated as an address of the user side node;
    wherein the user side flag is used for indicating that the message carrying the user side flag is sent from a user side node rather than a forwarding side node;
    wherein the multicast protocol message comprises a traffic request sent through a multicast protocol; and
    wherein the routing protocol message comprises prefix information with an added user side flag advertised through a routing protocol.

8. The method according to claim 7, wherein the user side flag is indicated by a flag bit defined in the multicast protocol message or the routing protocol message, or by a Type Length Value (TLV) defined in the multicast protocol message or the routing protocol message, or by a sub-TLV defined in the multicast protocol message or the routing protocol message.

9. The method according to claim 7, wherein the multicast protocol comprises at least one of: a Multicast Listener Discovery (MLD) protocol, an Internet Group Management Protocol (IGMP), and a Protocol Independent Multicast (PIM) protocol; and wherein the routing protocol comprises at least one of: a Babel protocol, a Border Gateway Protocol (BGP), an Open Shortest Path First (OSPF) protocol, and an Intermediate System-to-Intermediate System (ISIS) protocol.

10. A non-transitory computer-readable medium storing a plurality of instructions which, when executed by one or more processors, implement the information transfer method according to claim 7.

11. An information transfer device, comprising: a transmitting module, a memory, and a processor; wherein the memory is configured to store a program for information transfer which, when read and executed by the processor, causes the following operation to be performed:
    transmitting, by the transmitting module, a multicast protocol message or routing protocol message carrying a user side flag to a forwarding side node;
    wherein, the user side flag is used for indicating that the message carrying the user side flag is sent from a user side node rather than a forwarding side node, so that the forwarding side node could forward a packet to the user side node according to an address of the user side node;
    wherein the transmitting, by the transmitting module, the multicast protocol message carrying the user side flag to the forwarding side node comprises: sending, by the transmitting module through a multicast protocol, a traffic request carrying the user side flag; and
    wherein the transmitting, by the transmitting module, the routing protocol message carrying the user side flag to the forwarding side node comprises: advertising, by the transmitting module through a routing protocol, prefix information with an added user side flag.

12. The device according to claim 11, wherein the user side flag is indicated by a flag bit defined in the multicast protocol message or the routing protocol message, or by a Type Length Value (TLV) defined in the multicast protocol message or the routing protocol message, or by a sub-TLV defined in the multicast protocol message or the routing protocol message.

* * * * *